United States Patent
Shingu et al.

(10) Patent No.: US 11,679,655 B2
(45) Date of Patent: Jun. 20, 2023

(54) OUTER PINCH SENSOR

(71) Applicant: Honda Motor Co., Ltd., Tokyo (JP)

(72) Inventors: Hiroshi Shingu, Walled Lake, MI (US); Makoto Hirose, Utsunomiya (JP); Yuichiro Saiki, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 135 days.

(21) Appl. No.: 17/395,106

(22) Filed: Aug. 5, 2021

(65) Prior Publication Data
US 2023/0039719 A1    Feb. 9, 2023

(51) Int. Cl.
*B60J 10/86* (2016.01)
*B60J 5/06* (2006.01)
*B60J 5/04* (2006.01)

(52) U.S. Cl.
CPC ............. *B60J 10/86* (2016.02); *B60J 5/0468* (2013.01); *B60J 5/0477* (2013.01); *B60J 5/0493* (2013.01); *B60J 5/06* (2013.01)

(58) Field of Classification Search
CPC ........ B60J 10/86; B60J 5/0468; B60J 5/0477; B60J 5/0479; B60J 5/06; B60J 5/0493; E05F 5/14; E05F 15/42
USPC ............................................. 296/155; 49/27
See application file for complete search history.

(56) References Cited

U.S. PATENT DOCUMENTS

| | | | |
|---|---|---|---|
| 6,339,305 B1* | 1/2002 | Ishihara | E05F 15/44 49/27 |
| 7,958,672 B2* | 6/2011 | Ishihara | E05F 15/46 49/27 |
| 8,752,332 B2 | 6/2014 | Thiele et al. | |
| 9,441,408 B2* | 9/2016 | Matsumoto | H01H 3/142 |
| 10,648,216 B2* | 5/2020 | Taguchi | H03K 17/962 |
| 11,215,002 B2* | 1/2022 | Kamitani | B60J 10/86 |
| 11,377,897 B2* | 7/2022 | Matsumoto | E05F 15/70 |
| 11,420,504 B2* | 8/2022 | Matsumoto | B60J 5/0411 |
| 11,433,746 B2* | 9/2022 | Ishibashi | B60J 5/0468 |
| 11,434,687 B2* | 9/2022 | Grein | B60Q 1/323 |
| 2015/0267453 A1* | 9/2015 | Matsumoto | B60J 5/06 49/27 |

(Continued)

FOREIGN PATENT DOCUMENTS

JP    3853958    12/2006
JP    2009149180    7/2009

(Continued)

*Primary Examiner* — Jason S Morrow
(74) *Attorney, Agent, or Firm* — Rankin, Hill & Clark LLP

(57) ABSTRACT

An outer pinch sensor is an integral assembly for mounting on a double sliding door arrangement that covers an opening. The integral assembly includes a bracket, and a seal and sensor mounted to the bracket. The bracket is mounted to a leading edge of one of the doors, the leading edge leading the door when the door is moved in a closing direction. The bracket includes a flange for mounting to the door. When mounted to the door, the seal is arranged inboard of the sensor for sealing to an outer surface of the other door. The sensor is arranged furthest in the closing direction than the other components of the assembly so as to sense the presence of an object in the opening. A signal generated by the sensor may then be used to perform emergency operations for the door to prevent pinching of the object.

20 Claims, 3 Drawing Sheets

(56) References Cited

U.S. PATENT DOCUMENTS

2016/0305177 A1   10/2016  Koeda et al.
2020/0157872 A1    5/2020  Matsumoto et al.
2022/0325570 A1*  10/2022  Matsumoto ............ B60J 10/273

FOREIGN PATENT DOCUMENTS

| JP | 2009203714 | 9/2009 |
| JP | 6359979 | 7/2018 |
| JP | 2019186064 | 10/2019 |
| JP | 2019207765 | 12/2019 |
| JP | 2020004518 | 1/2020 |

\* cited by examiner

OUTER PINCH SENSOR

BACKGROUND

Vehicle doors may have sealing members for forming a seal around the outer periphery of the door, between the door and a frame of the vehicle. The sealing members form a seal between an external environment and an internal environment of the vehicle, to block the transmission of moisture, hot air, cool air, etc. between these two environments. The doors may also have various types of sensors for detecting if an object is blocking a closing path of the door, in which event the door may be prevented from closing in order not to damage the object.

BRIEF DESCRIPTION

According to one aspect, an integral assembly for mounting on a sliding door of a vehicle that is moveable between an opened position in which the door reveals an opening into the vehicle, and a closed position in which the sliding door covers the opening. The assembly includes a bracket, a seal, and a touch sensor. The bracket is for mounting the assembly to a leading edge of the door, which leads the door when the door is moved in a closing direction from the opened position to the closed position. The seal is arranged on the bracket and is configured to seal the leading edge of the door when the door is in the closed position. The touch sensor is arranged on the bracket and is configured to sense an object that is present in the opening. When the assembly is mounted on the door, the seal is arranged inboard of the sensor.

In another aspect, a double sliding door arrangement and a vehicle including the double sliding door arrangement both include a sliding first door configured to be moved in a first direction to reveal an opening in a vehicle and in a second direction to cover the opening, a sliding second door configured to be moved in the second direction to reveal the opening and in the first direction to cover the opening, and an integral assembly including a bracket, a seal, and a touch sensor connected to the first door. The bracket is mounted to the first door at an edge that interfaces with the second door. The seal is arranged on the bracket so as to seal the edge to the second door. The touch sensor is arranged on the bracket so as to sense an object that is present in the opening. The seal is arranged inboard of the sensor.

DETAILED DESCRIPTION

Figure 1:
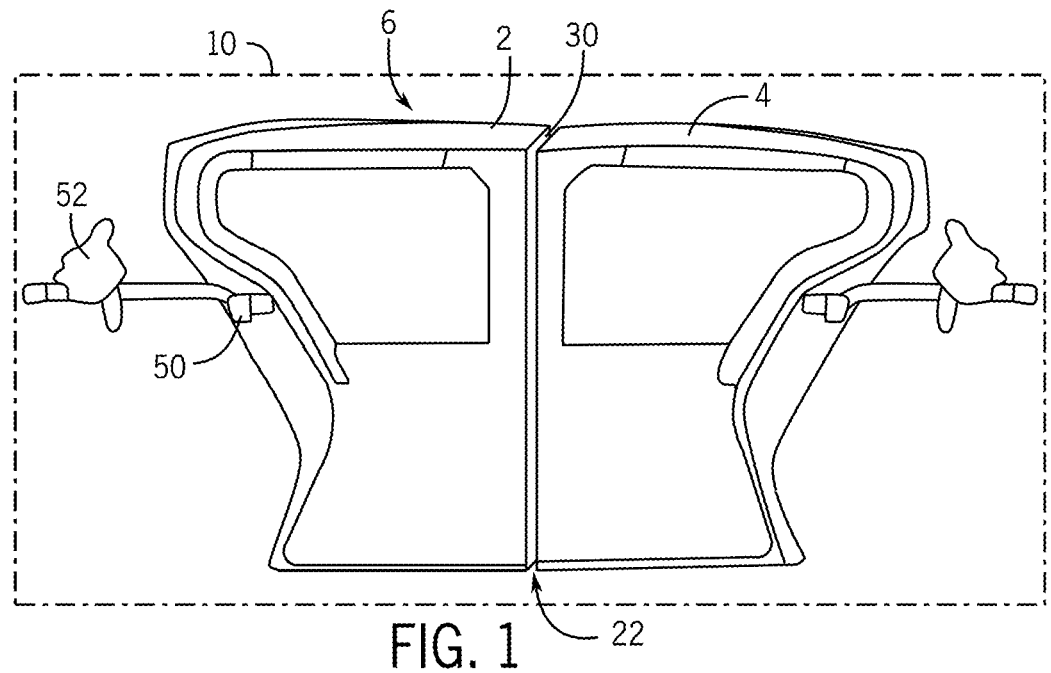
FIG. 1 is a side interior view of a double sliding door arrangement according to the present subject matter.

Referring to the figures, a first door 2 and a second door 4 are provided, and collectively make up a double door arrangement 6 in which the first door 2 and second door 4 are moveable between a closed position (FIG. 1, and dashed lines in FIG. 2) in which the doors 2, 4 cover an opening 8, and an opened position (solid lines in FIG. 2) in which the doors 2, 4 reveal the opening 8. The doors 2, 4 and opening 8 may be included as part of a vehicle 10, and thus the opening may provide access between an interior 12 and an exterior 14 of the vehicle 10. However, this arrangement as part of a vehicle 10 is not required, and the doors 2, 4 and opening 8 may be included as part of a stationary structure, such that the opening 8 provides access between the interior and exterior of the stationary structure, or between two compartments of the stationary structure.

The first door 2 and the second door 4 may each be moved between the opened position and the closed position by sliding, swinging, or otherwise. Such movement of the doors 2, 4 by a user may be accomplished manually by hand, or automatically using a motor or other motive power source.

Figure 2:
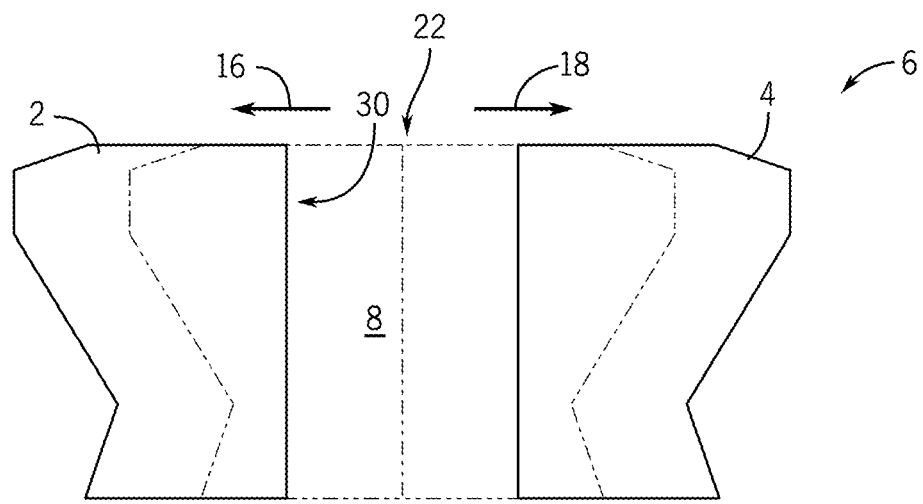
FIG. 2 is a schematic view of operation of a double sliding door arrangement according to the present subject matter.
Figure 3:
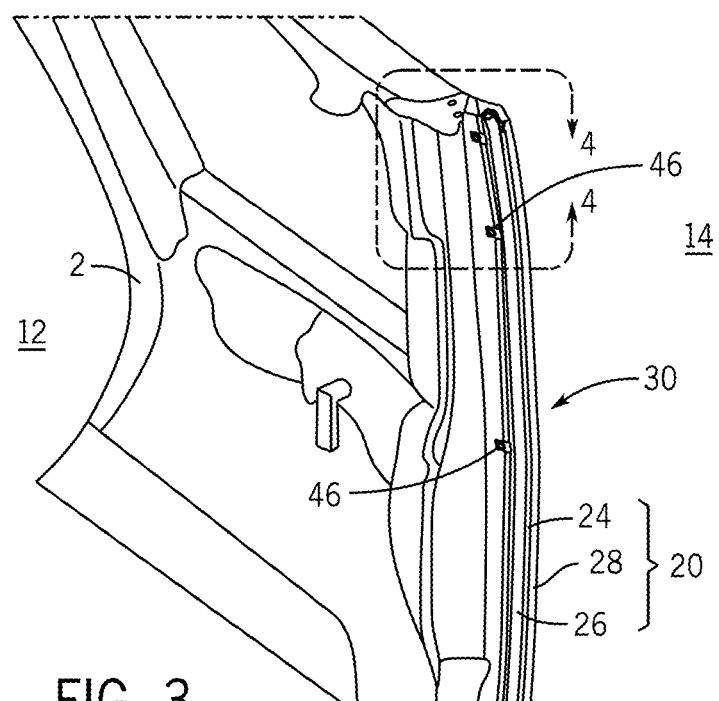
FIG. 3 is a perspective view of a first door of a doubling sliding door arrangement and including an outer pinch sensor according to the present subject matter.
Figure 4:
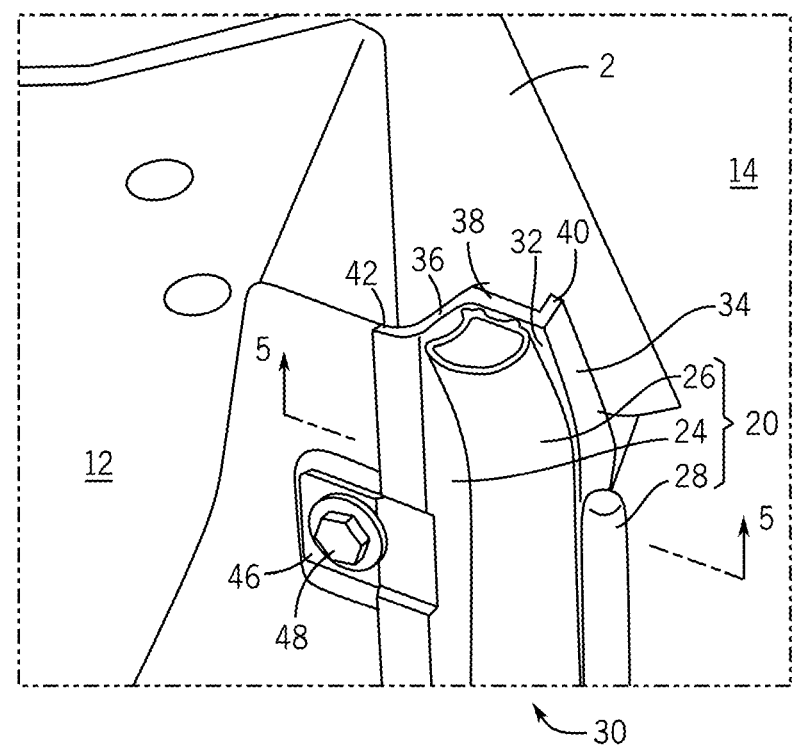
FIG. 4 is a detailed view of FIG. 3.

To open the doors, the first door 2 may be moved by sliding in a first direction 16 ("opening direction" for the first door) along an opening path from the closed position to the opened position, and the second door 4 may be moved by sliding in a second direction 18 ("opening direction" for the second door) along an opening path from the closed position to the opened position, in which case the doors 2, 4 are part of a double sliding door arrangement. The second direction 18 may be opposite from the first direction 16 such that the doors 2, 4 separate from each other as shown in FIG. 2 in order to reveal the opening 8. To close the doors, the first door 2 may be moved by sliding in the second direction 18 ("closing direction" for the first door) along a closing path from the opened position to the closed position, and the second door 4 may be moved by sliding in the first direction 16 ("closing direction" for the second door) along a closing path from the opened position to the closed position. Operation (i.e. opening and closing) of each of the doors 2, 4 may be performed simultaneously with, or separate from, the other door.

The first door 2 may be a rear door of the two doors 2, 4 of the vehicle 10, or may be a front door of the two doors 2, 4, while the second door 4 is the respective other (i.e. front or rear) door of the two doors 2, 4. When in the closed position, the first door 2 and the second door 4 may meet at an interface 22, and the first door 2 may overlap the second door 4 at the interface 22 when viewed from the exterior 14 (see FIG. 5).

The first door 2 includes an integral assembly 20 mounted thereon and affixed thereto. The integral assembly 20 may alternatively be mounted on the second door 4. The assembly 20 is not limited for use on the sliding double door arrangement 6, and may be used on a single sliding door arrangement that does not include a second door.

The integral assembly 20 is an elongated unitary component that includes an elongated bracket 24, an elongated seal 26, and an elongated sensor 28. The bracket 24, the seal 26, and the sensor 28 are separate and distinct components, but are connected together to form the integral assembly 20 before the integral assembly 20 is mounted to the first door 2.

The bracket 24 is for mounting the assembly 20 to the first door 2. The bracket 23 may be mounted to an edge 30 of the first door 2. The edge 30 is also referred to herein as a "leading edge" in that the edge 30 leads the first door 2 when the first door 2 moves in the second direction 18 ("closing direction" for the first door) from the opened position to the closed position, the "interface edge" in that the edge 30 is at the interface 22 and/or interfaces with the second door 4, or the "opening edge" in that edge 30 is closest to the opening 8 when the first door 2 is in the opened position.

The bracket 24 is an elongated one-piece component and is mounted to the first door 2. The bracket 24 may have a shape and/or contour that is adapted to a shape of the first door 2 so as to provide a closely mated interface between them. The bracket 24 may be made from a resin material by extrusion, in a mold, or by other methods. The bracket 24 can include other materials, such as metal, ceramic, or composite material, and be made by other production methods.

The seal 26 and sensor 28 are mounted/attached to the bracket 24. For this purpose, the bracket 24 may include a seal-mounting surface 32 to which the seal 26 is mounted, and a sensor-mounting surface 34 to which the sensor 28 is mounted. The bracket 24 may include a base plate 36, a first plate 38, a second plate 40, and a flange 42. The first plate 38 extends from one side of the base plate 36. The second plate 40 extends from the first plate 38 on a side of the first plate 38 opposite from the base plate 36. The flange 42 extends from the base plate 36 on a side of the base plate 36 opposite from the first and second plates 38, 40.

Figure 5:
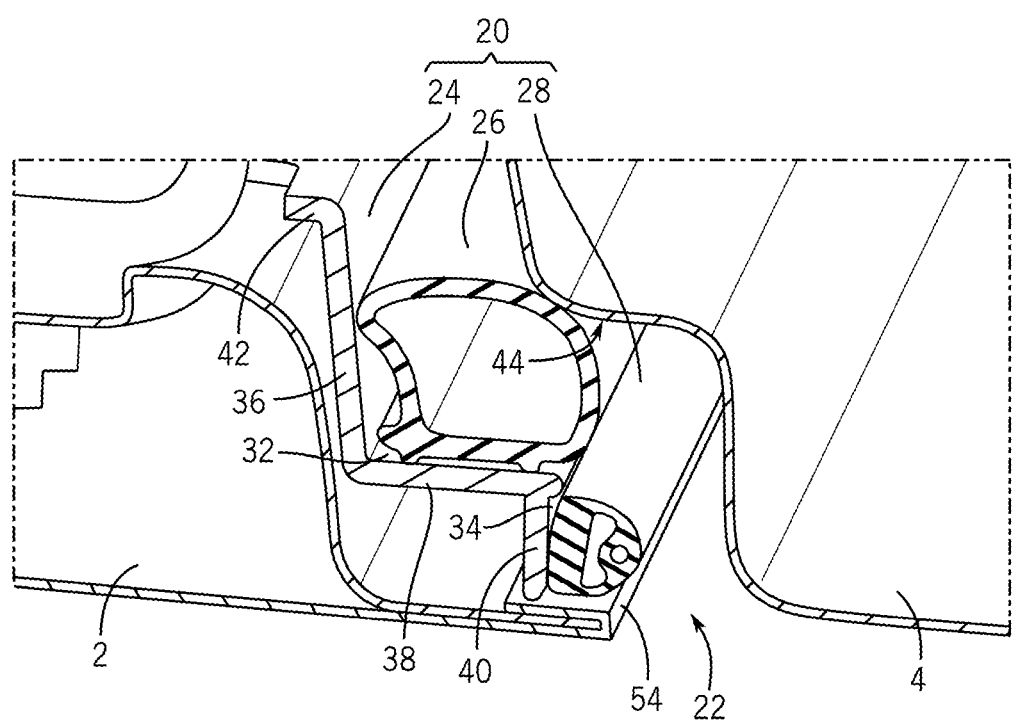
FIG. 5 is a cross-sectional view along line 5-5 of FIG. 4.

The bracket 24 may have a generally zigzag cross-sectional shape as shown in FIG. 5, having the plates 36, 38, 40 and flange 42 arranged at angles (e.g. about 90° or 80°-100° in cross-section with respect to the immediately adjacent plates or the immediately adjacent flange. The first plate 38 and the flange 42 may be perpendicular to the base plate 36, and the second plate 40 may be parallel to the base plate 36. This zigzag cross-sectional shape and the angle of about 90° is not required, and the bracket can have other cross sectional shapes and/or angles (e.g. from 20-160°), and the angles between immediately adjacent plates and the flange can be consistent within the bracket 24 or the angles may different within the bracket 24.

The first plate 38 may include the seal-mounting surface 32, and the second plate 40 may include the sensor-mounting surface 34. The seal-mounting surface 32 may face the interior 12 (i.e. an inboard direction), and the sensor-mounting surface 34 may be facing the second direction 18. The seal 26 may be mounted to the seal-mounting surface 32 and extend inboard (i.e. towards the interior 12) away from the seal-mounting surface 32. The sensor 28 may be mounted to the sensor-mounting surface 34 and extend in the second direction 18 (i.e. the closing direction) away from the sensor-mounting surface 34.

The seal 26 and the sensor 28 may be mounted to the respective seal-mounting surface 32 and the sensor-mounting surface 34 by various techniques, which may be the same or different between the two. The mounting techniques can include the use of adhesives, mechanical fasteners, interlocking structures, etc., which are used to connect the seal 26 to the bracket 24 at the seal-mounting surface 32 and connect the sensor to the bracket 24 at the sensor-mounting surface 34. The seal-mounting surface 32, being on the first plate 38, is a different surface than the sensor-mounting surface 34, which is on the second plate 40, and may thus the seal-mounting surface 32 be disposed at an angle (e.g. about 90°, perpendicular) from the sensor-mounting surface 34.

When the seal 26 and sensor 28 are mounted to the bracket 24, and the bracket is mounted to the first door 2, the seal 26 is arranged inboard of the sensor 28, meaning that the seal 26 is arranged closer to the interior 12 of the vehicle 10 than the sensor 28, and the sensor 28 is arranged further from the interior 12. This arrangement of the seal 26 may allow the seal 26 to contact an outer surface 44 of the second door 4 or other component when the first door 2 and the second door 4 are in the closed position so as to seal the edge 30 to the second door 4 or other component.

The sensor 28 is an elongated component arranged along a length of the bracket 24. The sensor 28 may be arranged on the bracket 24 so that the sensor 28 is furthest in the second direction 18 than the other components of the assembly 20 and optionally of the first door 2, and is arranged outboard of the seal 26, meaning that the sensor 28 is arranged closer to the exterior 14 than the seal 26. The sensor 28 may be arranged furthest in the second direction 18 than a terminal edge 54 of the first door 2, which terminal edge 54 is the furthest extent of the first door 2 in the second direction 18. This arrangement of the sensor 28 is shown in the figures, and may allow the sensor 28 to act as an outer pinch sensor by leading the first door 2 when moved in the second direction 18 and by therefore being able to sense the presence of an object in the opening 8, i.e. in the closing path of the first door 2, especially as the first door 2 moves in the second direction 18 along the closing path.

The flange 42 may be used for mounting the bracket 24 to the edge 30 of the first door 2. The plates 36, 38, 40 may also be used for this purpose. The flange 42 may include holes, which may be arranged in tabs 46 of the flange 42, and through which fasteners 48 are inserted and engaged/connected to the first door 2 to connect the bracket 24 to the first door 2.

The seal 26 is an elongated component mounted along a length of the bracket 24. The seal 26 is included for sealing the edge 30 of the first door 2 so as to form a separation between environments on either side of the first door 2. The seal 26 is not particularly limited, and can include various materials and may have various shapes so that it is capable of forming a seal at the edge 30. Use of the seal 26 may inhibit the transmission of moisture, heated air, cooled air, etc. between the exterior 14 and the interior 12, thus more easily allowing for a controlled environment to be created in the interior 12 of the vehicle 10. The seal 26 may include a synthetic rubber material that is elastic, and may deform when in contact with the outer surface 44 of the second door 4 so as to create a seal at the edge 30. When not in contact with the outer surface 44, the seal 26 may return to its original shape due to its elasticity. The seal 26 may be hollow or solid, and have various shapes so as to form a seal along the interface 22 between the first and second doors 2, 4.

The sensor 28 provides functionality to the assembly 20 by sensing the presence of an object in the opening 8 and thus making the assembly act as an outer pinch sensor to prevent pinching of the object. The sensor 28 is not particularly limited, and may include a touch/contact sensor, motion sensor, pressure sensor, image sensor, proximity sensor, force sensor, or combinations thereof. The sensor 28 detects if an object is in the opening 8 along the closing path. If this is detected, then the sensor generates and sends a signal indicating such detection. This signal may be sent to a control unit for performing an emergency operation of the first door 2 and optionally of the second door 4 so as to prevent a pinching on the object in the opening 8.

In non-limiting embodiments, the sensor 28 is a touch sensor, which functions to detect physical contact with an object in the opening 8. The contact with the object may occur during a movement of the first door 2 along the closing path, where the sensor 28 physically contacts the object that is in the opening 8. The detection of the physical contact with the object may rely on a physical deformation (e.g. compression) of the sensor 28.

The sensor 28 may be in communication with a control unit, which may receive the signal from the sensor 28 that indicates there is an object in the opening 8. The sensor 28 may be in communication with the control unit by hard wiring via a harness 50, or wirelessly via a wireless communicator.

The seal 26 may be mounted to the bracket 24 by passing connectors through the first plate 38 from a side opposite to the seal-mounting surface 32, so as to engage the seal 26 from a back side of the seal 26 and connect the seal 26 to the bracket 24. The sensor 28 may be mounted to the bracket 24 by passing connectors through the second plate 40 from a side opposite to the sensor-mounting surface 34, so as to engage the sensor 28 from a back side of the sensor 28 and connect the sensor 28 to the bracket 24. The seal 26 and sensor 28 may be mounted on the bracket 24 to form the integral assembly 20 before the integral assembly 20 is mounted to the first door 4 using the fasteners 48.

The first door 2 and the second door 4 may each individually be a powered door, where movement of the powered door is accomplished automatically using a motor or other motive power source. If the first door 2 is a powered door, then the control unit may, based on this received signal from the sensor 28, activate the emergency operation of the first door 2, which may include actuating the motor or other motive power source to stop the first door 2 from further movement in the second direction (i.e. closing direction), move the first door 2 in the first direction (i.e. opening direction), or combinations thereof. If the second door 4 is also a powered door, then the control unit may then, based on this received signal from the sensor 28, also activate the emergency operation of the second door 4, which may include actuating a motor or other motive power source to stop the second door 4 from further movement in the first direction (i.e. closing direction), move the second door 4 in the second direction (i.e. opening direction), or combinations thereof. The control unit may actuate the motor or other motive power source to perform any combination of the emergency operations of the first and second doors 2, 4 as a result of receiving the signal from the sensor 28.

The first door 2 and the second door 4 may each individually be a manual door, where movement of the manual door is accomplished by a user moving the manual door by hand. If the first door 2 is a manual door, the sensor 28 may be in communication with a control unit, which may receive the signal from the sensor 28 that indicates there is an object in the opening. The control unit may then, based on this received signal, activate the emergency operation of the first door 2, which may include actuating a braking mechanism to stop the first door 2 from further movement in the second direction (i.e. closing direction). If the second door 4 is also a manual door, then the control unit may then, based on this received signal, activate the emergency operation of the second door 4, which may include actuating a braking mechanism to stop the second door 4 from further movement in the first direction (i.e. closing direction). The control unit may actuate the braking mechanism to perform any combination of the emergency operations of the first and second doors 2, 4 as a result of receiving the signal from the sensor 28.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An integral assembly for mounting on a sliding door of a vehicle, the sliding door being moveable between an opened position in which the door reveals an opening into the vehicle, and a closed position in which the sliding door covers the opening, the assembly comprising:
 a bracket for mounting the assembly to a leading edge of the door, the leading edge leading the door when the door is moved in a closing direction from the opened position to the closed position;
 a seal arranged on the bracket and being configured to seal the leading edge of the door when the door is in the closed position; and
 a touch sensor arranged on the bracket and being configured to sense an object that is present in the opening;
 wherein when the assembly is mounted on the door, the seal is arranged inboard of the sensor.

2. The assembly according to claim 1, wherein:
 the bracket includes a seal-mounting surface and a sensor-mounting surface;
 the seal is mounted to the seal-mounting surface;
 the sensor is mounted to the sensor-mounting surface; and
 when the assembly is mounted on the door, the seal-mounting surface faces an inboard direction, and the sensor-mounting surface faces the closing direction.

3. The assembly according to claim 2, wherein the sensor-mounting surface is perpendicular to the seal-mounting surface.

4. The assembly according to claim 2, wherein:
 the seal extends inboard from the seal-mounting surface; and
 the sensor extends in the closing direction from the sensor-mounting surface.

5. The assembly according to claim 3, wherein the bracket includes:
 a base plate,
 a first plate extending from the base plate and including the seal-mounting surface,
 a second plate extending from the first plate and including the sensor-mounting surface, and
 a flange for mounting the assembly to the leading edge of the door and extending from the base plate.

6. The assembly according to claim 5, wherein:
 the flange includes holes; and
 the assembly further including connectors for inserting through the holes in the flange for engaging the door to connect the bracket to the door.

7. The assembly according to claim 6, wherein the flange includes tabs in which the holes are arranged.

8. The assembly according to claim 5, wherein:
 the first plate and the flange are perpendicular to the base plate, and
 the second plate is parallel to the base plate.

9. The assembly according to claim 5, wherein the bracket is a one-piece bracket comprising a resin material.

10. The assembly according to claim 1, the seal is configured to seal the leading edge of the door by contacting a second sliding door of the vehicle.

11. A double sliding door arrangement comprising:
 a sliding first door configured to be moved in a first direction to reveal an opening in a vehicle and in a second direction to cover the opening;
 a sliding second door configured to be moved in the second direction to reveal the opening and in the first direction to cover the opening; and
 an integral assembly including a bracket, a seal, and a touch sensor connected to the first door;
 wherein the bracket is mounted to the first door at an edge that interfaces with the second door,
 wherein the seal is arranged on the bracket so as to seal the edge to the second door, wherein the touch sensor is arranged on the bracket so as to sense an object that is present in the opening, and wherein the seal is arranged inboard of the sensor.

12. The double sliding door arrangement according to claim 11, wherein when the first door is in a closed position, the seal contacts an outer surface of the second door to seal the edge to the second door.

13. The double sliding door arrangement according to claim 11, wherein the bracket includes:
a base plate;
a first plate extending from the base plate, the seal being mounted to the first plate;
a second plate extending from the first plate, the sensor being mounted to the second plate; and
a flange extending from the base plate and mounted to the first door.

14. The double sliding door arrangement according to claim 13, wherein:
the first plate includes a seal-mounting surface to which the seal is mounted;
the seal-mounting surface faces an inboard direction;
the seal extends inboard from the seal-mounting surface;
the second plate includes a sensor-mounting surface to which the sensor is mounted;
the sensor-mounting surface faces the second direction; and
the seal extends in the second direction from the seal-mounting surface.

15. The double sliding door arrangement according to claim 14, wherein the sensor-mounting surface is perpendicular to the seal-mounting surface.

16. The double sliding door arrangement according to claim 13, wherein:
the first plate and the flange are perpendicular to the base plate, and
the second plate is parallel to the base plate.

17. The double sliding door arrangement according to claim 13, wherein:
the flange includes holes; and
fasteners are inserted through the holes in the flange and engage the first door to thereby connect the bracket to the door.

18. The double sliding door arrangement according to claim 17, wherein the flange includes tabs in which the holes are arranged.

19. The double sliding door arrangement according to claim 13, wherein the bracket is a one-piece bracket comprising a resin material.

20. A vehicle including the double sliding door arrangement according to claim 11.

* * * * *